Oct. 11, 1966    J. D. TOWERY ET AL    3,277,581
MOISTURE CONTROL METHOD AND SYSTEM FOR COTTON DRYERS
Filed Nov. 15, 1963    5 Sheets-Sheet 2
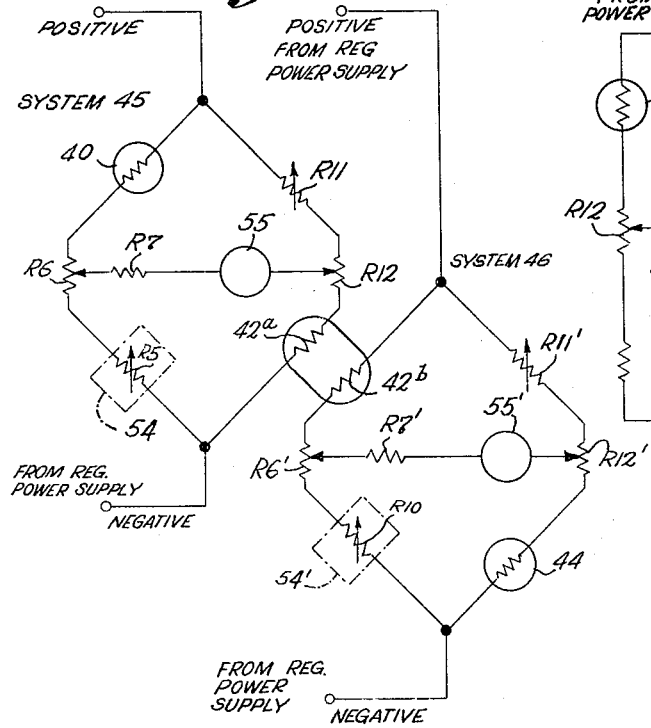
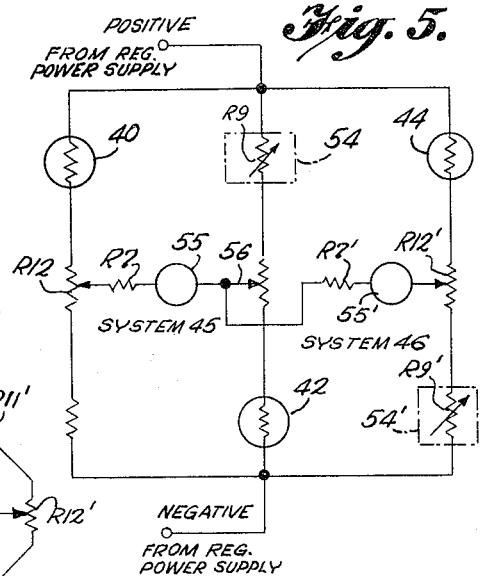
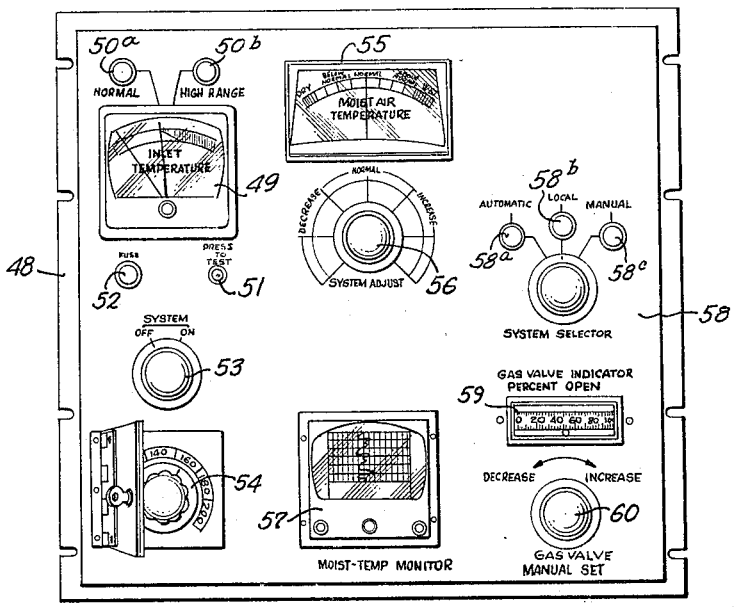

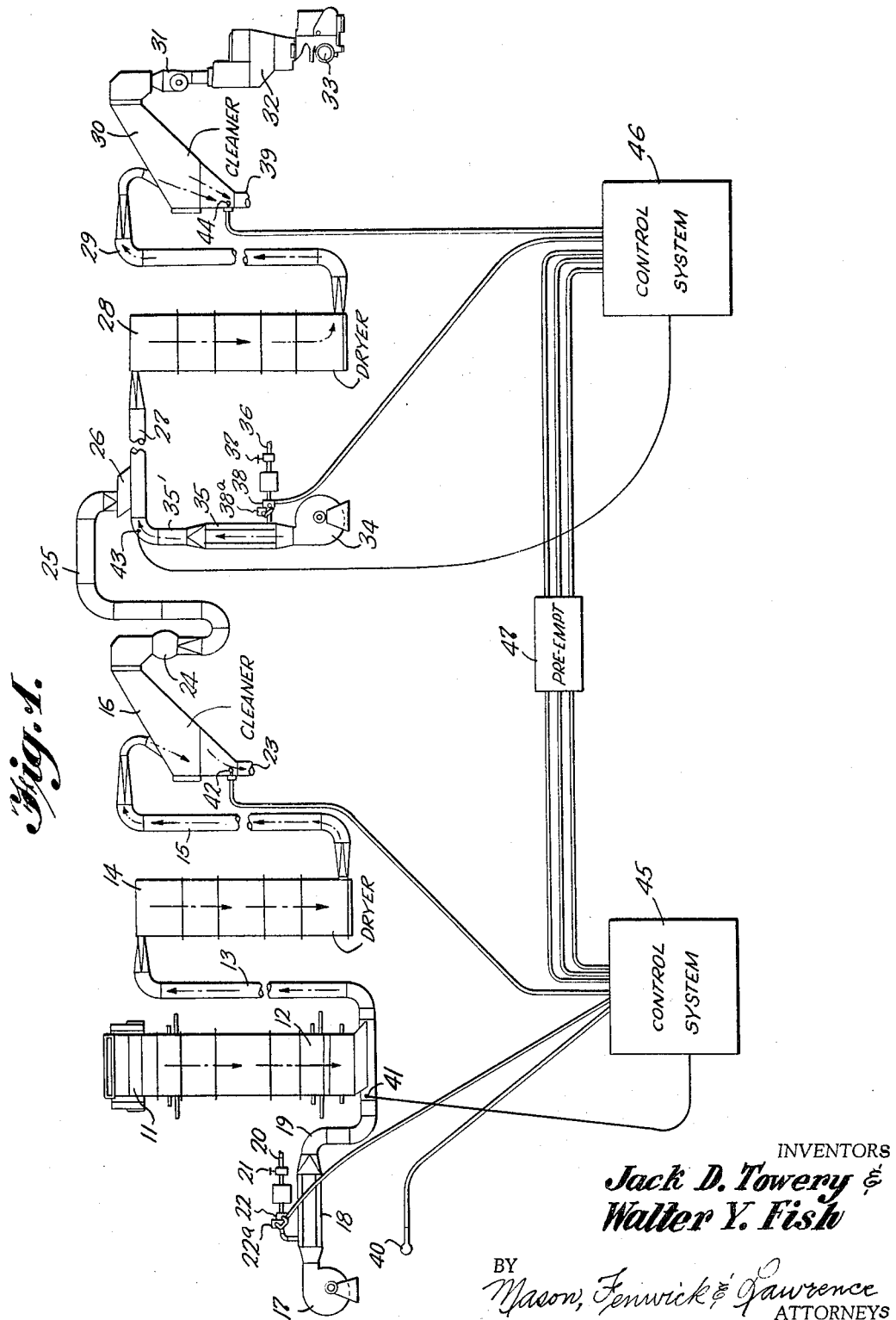

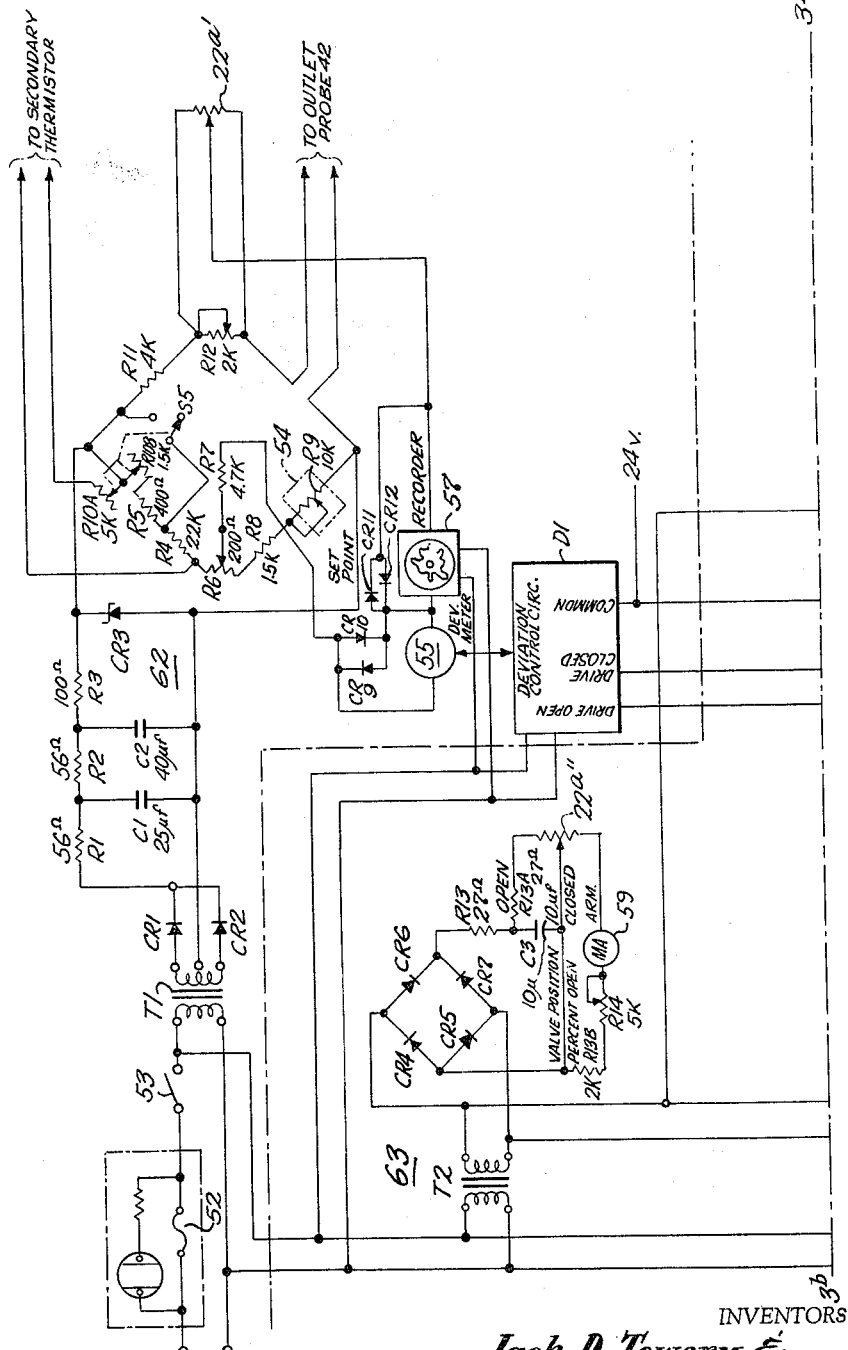

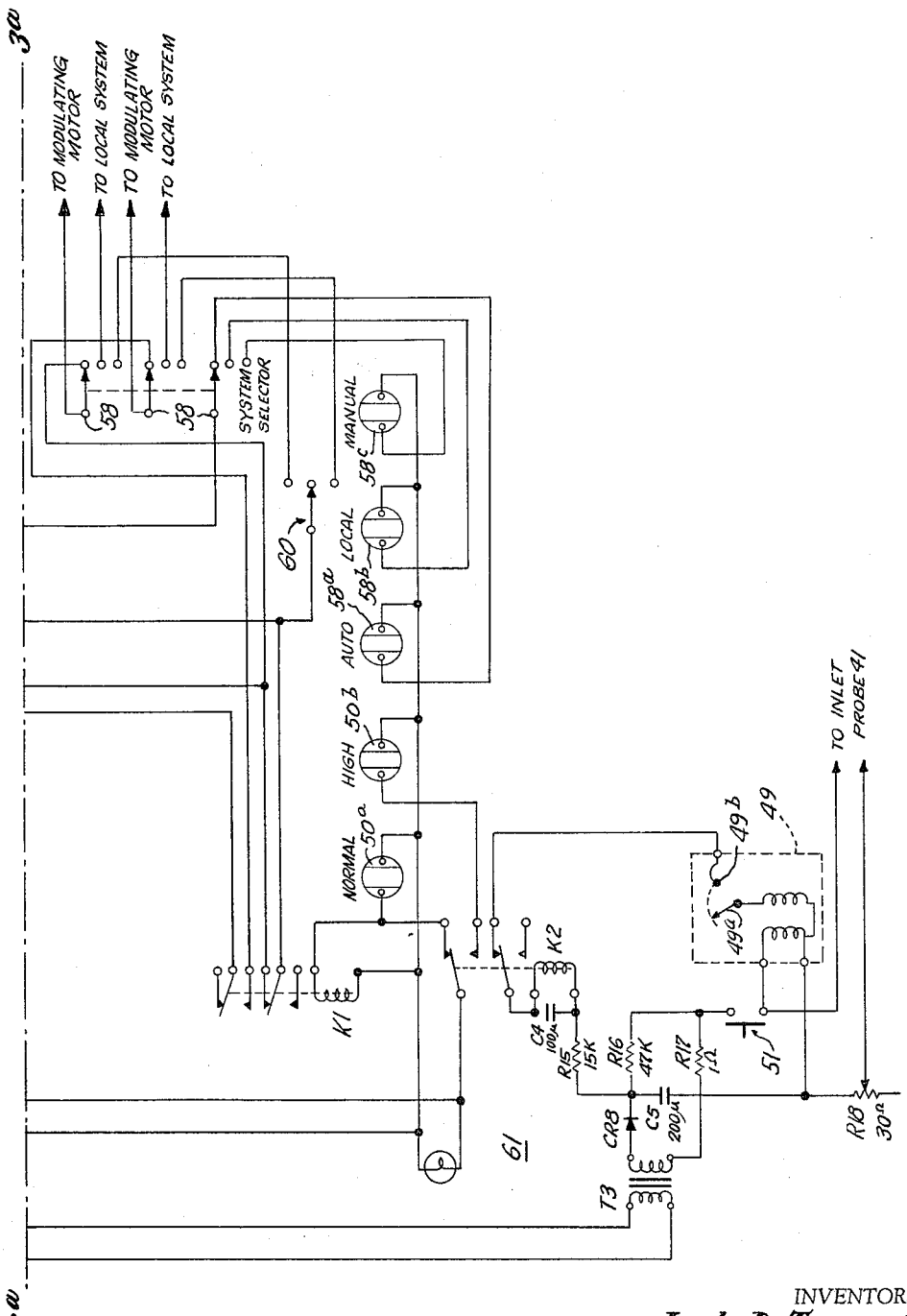

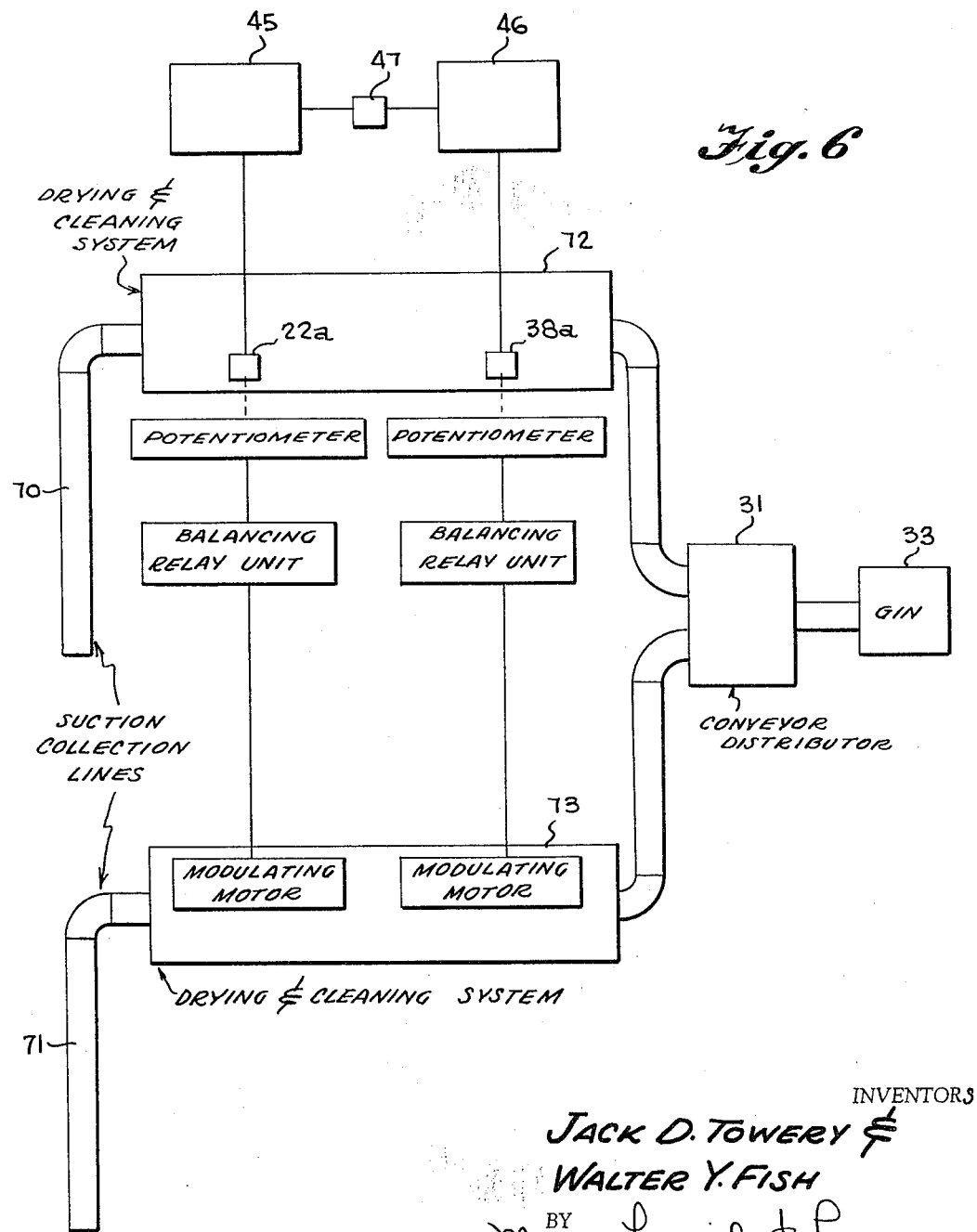

United States Patent Office 3,277,581
Patented Oct. 11, 1966

3,277,581
MOISTURE CONTROL METHOD AND SYSTEM
FOR COTTON DRYERS
Jack D. Towery, Lubbock, Tex., and Walter Y. Fish, Tucson, Ariz., assignors, by direct and mesne assignments, to Moss-Gordin Company, Lubbock, Tex., a corporation of Texas
Filed Nov. 15, 1963, Ser. No. 324,079
19 Claims. (Cl. 34—31)

The present invention relates to automatic moisture control systems associated with drying apparatus for moisture-containing materials to regulate the drying apparatus to establish selected moisture content levels for the materials discharged therefrom, and more particularly to moisture control systems for drying apparatus used to prepare seed cotton for introduction into a gin stand operative responsive to sensing of air temperature in and about the drying apparatus to automatically regulate the supply of fluid heating medium to the drying apparatus so as to maintain the cotton discharged therefrom at a selected moisture content.

While the present invention is applicable to regulation of drying of a wide variety of moisture-containing materials, it was specifically designed for the control of drying apparatus for drying seed cotton preparatory to feeding the same into a gin, and the ensuing description will be directed to that specific field of use from which its application to other materials will be apparent.

The present invention has particular utility for drying material such as mechanically or hand harvested cotton as it is received from the cotton bins or trailers by which the cotton is hauled to the gin, and which cotton includes usual trash content, for example, particles of field earth, leaves, sticks, weeds, and other debris that has become mixed with the cotton. It has been found that if the moisture retained by the plant components of such raw cotton that is to be cleaned is too great, it will pack and mat up against circular saw blades as the raw cotton fiber is torn away from its associated seed, during the ginning operation that follows the aforementioned drying operation. On the other hand, it has also been found that if too much moisture has been removed from such raw cotton or, in other words, if there is an excessive amount of drying of the cotton fibers, the subsequent ginning of this type of cotton will produce an undesirable overdried poor colored short fiber or brittle cotton.

It has been determined that the optimum quality of cotton occurs when seed cotton has a moisture content of about 5% to 6% at the moment of actual ginning and lint cleaning. Due to varying external influences it has been very difficult to maintain such a moisture content operating point under present cotton processing practices in ginning. For the most part, present day systems for drying seed cotton to condition the seed cotton so that it will have a selected moisture content when it is introduced into a gin stand or lint cleaner tend to rely on the judgment of the gin operator. Although the operator may be extremely expert in judging the cotton moisture content, the widely varying conditions will not allow accurate operator control of the drying apparatus so as to ensure consistent attainment of the desired moisture content, nor is it reasonable to presume that the gin operator will spend twenty-four hours a day judging the effect of these conditions and adjusting the dryer temperature accordingly.

Furthermore, it is extremely difficult to obtain consistently reliable measurements of the moisture content of seed cotton with present day moisture content measuring equipment to permit reliable operator adjustment or automatic adjustment of the dryer temperature. Conventional apparatus for measuring the moisture content of seed cotton have taken the form of portable moisture meters or stationary moisture meters built into the cotton processing system operating on the principle of measuring the resistance to flow of electric current through cotton. Cotton, when bone dry, is nonconductive to the point of being a good insulator. Illustrative of this is the fact that treated cotton yarn has been used for electric wire insulation. As cotton absorbs moisture, it becomes a better conductor, even though normal moisture content of cotton does not make it conduct electric current as well as other materials. Therefore, dry cotton introduces problems of static electricity build up, which are usually sought to be eliminated by the use of humid air. The high voltage required to overcome the effect of static electricity introduces undesirable conditions, and the inability to distinguish between one wet boll in a mass of cotton and much more cotton not so wet causes false readings rendering the electrical method of measurement of moisture content in seed cotton and control based on such electrical measurement a poor basis for regulation of moisture content of seed cotton in gin pretreating lines.

The applicants have discovered, however, that there is a good correlation between moisture content differential of the cotton as it passes through a dryer (i.e. the moisture extracted) and the temperature differential between inlet temperature of outside air is usually the temperature of the cotton supplied to the seed cotton drying system. It is known that cotton, being hygroscopic, will reach on equilibrium condition in any atmosphere—that is, in any temperature and humidity. Therefore, for any given set of temperature and relative humidity conditions, since the heat introduced into a drying system goes to the atmosphere external of the dryer, to the cotton to warm it, and to evaporate the moisture of the cotton, and the amount of heat going to said atmosphere (heat loss) can be measured by running the drying system without cotton, and the amount of heat required to warm the cotton to a selected temperature is based on the introduction temperature of the cotton, the balance of heat obviously is consumed in evaporating the moisture within the cotton. Thus by measurement of the temperature differential between the air at the inlet of the dryer and the air at the outlet of the dryer, which is proportional to the moisture removed and deducting the differential between the cotton temperature when it enters the drying system and the temperature when it leaves the drying system, a convenient measurement is provided by which reliable automatically monitoring of the conditions during the drying process can be continuously conducted to achieve automatic adjustment of the dryer temperatures to give a specific moisture content of discharged cotton.

An object of the present invention, therefore, is the provision of a novel method and means for treating moisture containing materials, especially seed cotton and the like, to maintain the moisture content thereof at a selected discharge point within a selected optimum range of moisture content.

Another object of the present invention is the provision of a novel method and apparatus for monitoring conditions in a drying system for conditioning seed cotton and other hygroscopic materials for introduction to a selected processing stage, and automatically adjusting a drying medium responsive to the conditions sensed to condition the treated material to a selected moisture content.

Another object of the present invention is the provision of novel means for controlling the application of heating medium to seed cotton drying apparatus for automatically maintaining moisture content of the seed cotton leaving the drying apparatus within a selected range wherein the heating medium is controlled responsive to the variations in ambient temperature and in the temperature differential between the temperatures of air at the cotton inlet and cotton outlet of the drying apparatus.

Another object of the present invention is the provision of novel apparatus for drying seed cotton and the like preparatory to ginning the same wherein a pair of cotton dryers are arranged in a series flow path for the cotton, and automatic control means responsive to the temperature of ambient air and of air at the cotton inlet and cotton outlet of each dryer are provided to regulate the application of heating medium to the dryers so as to maintain moisture content of the seed cotton discharged from the last dryer in the series in a selected optimum range.

Another object of the present invention is the provision of novel automatic control apparatus responsive to air temperatures at selected points for regulating heating in a drying system including a pair of dryers arranged in series in a flow path for a hygroscopic material to be processed, especially seed cotton being treated for introduction into a gin stand wherein means are provided for coordinating application of heating medium to the pair of dryers so as to maintain the moisture content of the processed material being discharged from the drying system within a selected optimum range notwithstanding variations in ambient temperature or in the moisture content of cotton supplied to the drying system.

Other objects, advantages, and capabilities of the present invention will become apparent from the following detail description, taken in conjunction with the accompanying drawings illustrating a preferred embodiment of the invention.

In the drawings:

FIGURE 1 is a diagrammatic view of an automatic moisture control cotton drying system embodying the present invention;

FIGURE 2 is a front elevation view of the control panel for one of the instrument packages of the control system;

FIGURES 3a and 3b form a schematic diagram of the electrical circuit for the moisture control unit for one cotton dryer;

FIGURE 4 is a schematic diagram of a "preempt" interconnection between the bridge-control circuit for the two dryers which electrically isolates but thermally connects the circuits; and FIGURE 5 is a schematic diagram of the bridge circuit for directly interconnecting the two dryer control units in a preempt arrangement.

FIGURE 6 is a schematic diagram of a modification of the present invention employing two separate cotton cleaning and drying systems with respective associated suction collection lines, one being slaved to the other.

The present invention in general involves the strategic location of air temperature sensors at positions to monitor the temperature of heated air being supplied to the inlet of a drying tower or each one of a pair of series connected drying towers and to monitor the air leaving the tower or each of the pair of towers, together with an external air temperature sensor to monitor variations in ambient air. The drying tower or towers may be heated in the usual way by heat exchanger chambers or burners having valve regulated fuel supply lines by which the temperature of the heated air is controlled. Suitable electronic circuitry receives signals from the sensors signifying the sensed temperature conditions and from them derives information as to ambient temperature which effects heat loss due to system radiation loss to atmosphere and raising of cotton temperature and information as to the temperature differential between the heated air at the drying tower inlet and at the tower outlet which is related to heat loss due to moisture evaporation and thus the moisture extracted from the cotton in each dryer. The circuitry produces control signals for activating the burner fuel valves when conditions sensed vary from those necessary to produce the moisture content desired at the discharge end of the dryer or series of dryers so as to continuously regulate the drying air temperature to give the desired moisture content of the discharged cotton. Where two dryers are used in series, a preempt circuit correlates the control action on the burners for the two dryers, so that a desired balance may be maintained between them.

Referring particularly to the exemplary system installation of the present invention shown in FIGURE 1 in conjunction with a typical cotton processing line for preparing cotton to be delivered to a gin stand, the seed cotton transported from the field to the gin is withdrawn from the truck bed, trailer, or other transporting vehicle container in the conventional manner by the usual suction line and may, if desired, be subjected to some known precleaning procedures, prior to the drying stages. The cotton withdrawn from the transporting vehicle is conveyed to a separator 11, which may be of any known type, and is delivered from the separator outlet through a suitable vacuum head 12 to a duct 13 through which the cotton is delivered to the top of a first drying tower 14. The cotton, upon passage downwardly through the drying tower 14, is then conveyed by a duct 15 extending from the bottom of the tower 14 to the inlet of an incline cleaner 16, in which dirt, leaves and sticks and like trash are removed from the cotton as it is conveyed upwardly along an inclined path to the outlet of the incline cleaner 16.

Heating medium, in this case heated air, is supplied to the duct 13 and drying tower 14 to extract moisture from the cotton in the drying tower 14, by a blower 17 which draws ambient air through its intake and propels the same through the heat exchange chamber of a burner 18 and thence through duct 19 to the duct 13 at the connection of the latter with the outlet of the vacuum head 12. The burner 18 in this example is a gas fired burner wherein the gas fuel is supplied through supply line 20 regulated by a cutoff valve 21 and a modulating valve 22 to control the heating attained in the burner chamber and thus the temperature of the air supplied to the duct 13 and drying tower 14. The hot moist air which leaves the dryer with the cotton and enters the incline cleaner 16 is withdrawn from the cotton stream through an outlet line 23 connected to the bottom of the incline cleaner, while the cotton which is physically propelled up the inclined grid system of the incline cleaner 16 is dischargd through a vacuum head 24.

In the two stage drying system of this example, the cotton discharged through the vacuum head 24 is conveyed by suitable known means, for example the transfer duct 25 to a blow box 26 to be injected into a duct 27, through which the cotton is delivered to the top of a second drying tower 28. Upon passage downwardly through the dryer 28, the cotton exists through outlet duct 29 to the inlet of a second incline cleaner 30, where the cotton is physically propelled upwardly over the grid system of the cleaner 30 and discharged through a conventional conveyor distributor 31 and feeder 32 to the group of gin stands, one of the gin stands being shown at 33.

Heating air for the second drying tower 28 is supplied by the blower 34 which delivers ambient air through the heat exchange chamber of burner 35 and outlet duct 35' which joins the duct 27 at the blow box 26. The gas fuel supply to burner 35 through supply line 36 is regulated by cutoff valve 37 and modulating valve 38 to control the temperature of the heated air supplied by burner 35 to the second drying tower 28. The moist, hot air which leaves the second dryer 28 with the cotton and enters the incline cleaner 30 is withdrawn through outlet line 39. The drying tower 28 may be identical in construction to the drying tower 14, as may the blower 34, burner 35, and valves 37, 38 be identical to their corresponding blower 17, burner 18 and valves 21, 22 associated with the first drying stage.

As is shown in the drawings, an ambient temperature probe 40, which may be a conventional thermistor probe, to sense the temperature of ambient air, is located at a convenient place in the general vicinity of the dryers 14, 28 in the gin. This temperature sensing probe 40 may be placed at any convenient place in the installation to accurately reflect true ambient temperature and is of the type to provide electrical signals indicative of the temperature sensed. An inlet temperature probe 41, which is preferably a conventional thermocouple probe to sense the temperature of the heated air supplied to the first dryer 14 from the burner 18 prior to contact of the heated air with the cotton, is positioned in the duct 19 close to the point where the duct 19 joins the duct 13. An outlet temperature probe 42, preferably of the thermistor type, for sensing the temperature of the hot moist air leaving the dryer 14 and producing correlated electrical signals is provided at an appropriate location in the system, for example at the inlet of the air outlet line 23 of the first incline cleaner 16. By these three temperature probes 40, 41 and 42, electrical signals indicative of the ambient air temperature and of the heated air temperature at the cotton inlet to the dryer 14 and at the outlet end of the dryer 14 are produced which provide the necessary information for automatically regulating the heat supply to the dryer 14.

Similarly an inlet temperature probe 43, similar to probe 41, is disposed in the duct 35' adjacent the juncture of this duct with the blow box 26 and duct 27 and an outlet temperature probe 44 similar to probe 42 is located at the inlet of air outlet line 39 of the second incline cleaner 30 to provide electrical signals indicative of the temperature of the heated air supplied to the second dryer 28 and of the hot moist air leaving the dryer 28. The signals from each of these probes 40 to 44 are sent to the control system, indicated at 45, for the first dryer stage and the control system 46 for the second dryer stage in a selected manner and these control systems are coordinated in a selected way, all to be described hereinafter, to produce output control signals to be applied to the modulating valves 22, 38 for appropriately regulating the burners 18, 35 to provide the desired degree of drying in the two dryers 14 and 28 to insure that the discharged cotton has a selected moisture content.

It has been found that the temperatures monitored at these five points are adequate to permit accurate and reliable automatic control of the moisture content of the cotton discharged from the system. As a matter of fact, where the moisture content of cotton in the region served by the gin does not greatly exceed the optimum moisture content to be established for cotton fed to the gin stand, only one dryer and associated controls may be adequate, in which event the temperatures monitored by the three probes 40, 41 and 42 are sufficient for effective control. It is unnecessary in either case to directly measure any wet bulb temperature in the system to determine relative humidity, or to directly measure the temperature of the cotton by probes contacting the cotton. Since the seed cotton and lint moisture content as they come from the field have a moisture content at equilibrium with relative humidity of the air, and the temperature of the cotton as it is fed into the hot air system at the first dryer 14 is approximately the same as the dry bulb temperature of the ambient air, particularly when one considers the amount of outside air that is pulled through the cotton as it enters the gin through the usual suction collecting duct, it is unnecessary to make any wet bulb correction for the control system or to even know relative humidity, and direct measurement of cotton temperature at the feed end of the dryer system is not required because the ambient dry bulb temperature is related to cotton temperature. The ambient temperature sensed by the probe 40 therefore provides in one reading an indication of the dry bulb ambient air temperature and the entering cotton temperature. The ambient temperature probe 40 is thus actually measuring, indirectly, two quantities: (1) the heat loss of the system, and (2) the temperature of the cotton as it comes to the gin, since the heat loss of the system through radiation to atmosphere varies in a determinable relation to variation in ambient temperature, the heat loss due to heating the cotton to the cotton discharge temperature also varies in a determinable relation to variation in cotton entering temperature, and cotton entering temperature is approximately equal to ambient air temperature. If the values of heat loss to the system and cotton entering temperature were plotted on a curve, it would be observed that these values would parallel each other. For any set of conditions, the signal from the ambient temperature probe 40 will remain constant.

The outlet temperature probe 42 is the primary controlling probe, which is sensing the temperature of the moist hot air after the air has left the cotton discharged from the first dryer 14. Since it would be impossible for the cotton to be any hotter than the heated air in which it is travelling upon discharge from the dryer 14, one can assume that the probe 42 will measure the temperature of the cotton. As was previously stated, the temperature differential between the temperatures of the inlet air and the outlet air sensed by the probe 42 is the heat loss that can be assigned to the moisture content of the cotton and the heat loss of the system at a constant ambient condition. If one deducts the heat loss of the system and the heat required to warm the cotton, both bearing a determinable relation to the measurement made by the ambient temperature probe 40, the resultant difference will be a measure of the moisture content of the cotton as it affects the drying system, that is, will be proportional to the moisure removed.

The second drying stage of the dual dryer system works exactly as the first in measuring inlet air temperature at the probe 43 and outlet air temperature at the probe 44, except that ambient air temperature does not affect the second drying stage. A correction is not needed at this point, corrections for ambient variations for the whole dual system having already been made in the first drying stage and the first dryer 14 having conditioned the cotton to a relatively high temperature.

The two modulating valves 22, 38 are adjusted by suitable modulating motors 22a, 38a, controlled by the control systems 45, 46 involving suitable bridge circuitry as detailed hereinafter, to vary the fuel supply to the burners 18, 35 in preselected relation to adjust the amount of heat supplied to the dryers 14 and 28 as the amount of moisture fluctuates. In the preferred example, a pair of potentiometers is attached to the modulating motor, one of which serves as a valve position indicating potentiometer to provide signals to the control system by which a meter indication of valve position can be supplied, and the other of which serves as a feedback potentiometer to reflect to the bridge circuit the electrical conditions which vary as the valve position varies, and thus which provide a representation of the inlet air temperature supplied by the burners as this inlet air temperature varies as a known function of valve position. By coupling into the bridge circuit electrical conditions reflecting valve position and thus inlet air temperature, and outlet air and ambient temperatures, differential temperature variations and ambient variations produce signals which cause the control system to react in accordance with the predetermined correlation found to exist between these factors and moisture content in such a manner as to maintain equilibrium. Signals produced as the control system maintains an internal equilibrium provide control signals to the modulating valves to adjust the heat input to the first dryer system. If for example, 8% moisture content out of the first dryer is selected, the controls can be set to provide this outlet moisture content, and there will be a temperature on the outlet side of this dryer that will produce this result. As this outlet temperature varies due to the presence or absence of moisture above or below this level, the control system will be thrown out of balance requiring the modulating motor 22a to move. As the feedback potentiometer for this valve 22 is repositioned, a new balance is established which will continue until another temperature change occurs. In this fashion, the temperature differential varies with moisture content automatically and results in uniform moisture content discharged from the first dryer on into the second dryer. If a dual dryer system is used, a selected balance or correlation between the first drying system and second drying system is maintained by a correlating or preempt unit 47, to be later described. Any imbalance between the two systems through the action of the preempt unit causes the modulating valves 22, 38 to increase or decrease fuel supply to the burners to increase or decrease the heat as required.

If outside conditions change, such as from day to night, the heat loss of the system increases and the temperature of the cotton is lower, so that more heat is required. The control system senses this by change in the signals delivered by the ambient temperature probe 40, and automatically corrects by opening the modulating valve 22 wider to provide more heat to dry the same amount of cotton at the same inlet moisture content.

Thus by establishing a set of initial control conditions for the dryers to provide a selected moisture content of cotton to be discharged from each dryer for a given set of input cotton moisture content conditions and ambient conditions, the dryer system or systems, when adjusted for that set of conditions and operated by the control systems in accordance with the determined correlation between temperature differential of inlet and outlet air and moisture content and ambient air will automatically correct for variations in moisture content of input cotton or variations in system loss to ambient air and to heating the cotton arising when ambient temperature changes, so as to maintain uniform moisture content of discharged cotton.

Each of the control systems 45, 46 for the two dryer systems includes control system panels 48, which are identical in arrangement and content, one of which is illustrated in FIGURE 2. The control system panel 48 contains a number of manual controls, indicating meters, signal lamps, a graph monitor, and a test push-button switch to facilitate proper monitoring of the automatic moisture content system by the gin operator and to permit certain control manipulations by the operator.

Referring to FIGURE 2 illustrating a preferred example of the control system panel 48, an inlet temperature meter 49 is provided in the upper left-hand corner, having a manually set needle to be set by the installation engineer to a selected temperature in accordance with the thermodynamic conditions at the gin installation, and a movable needle which assumes angular positions indicative of the air inlet temperature of the associated dryer system. Above the meter 49 is a green light 50a labeled "normal" and a red light 50b labeled "high range" which are energized when the moving needle of meter 49 is to the left and right respectively of the pre-set needle. A "press to test" push button 51 is provided below the input temperature meter 49 to permit determination that all components are working properly, as well as the fuse 52. Below the fuse 52 and button 51 is the system on-off switch 53, below which is the "outlet temperature set" dial 54 which is housed in a well and covered by a hinged door under lock and key and is to be set by the installation engineer upon initial calibration of the system. In the center top of the panel 48 is the "moist air temperature" meter 55, having for example a color coded arc scanned by the meter pointer, the center being a green area marked normal, flanked by orange areas on the left and right marked "below normal" and "above normal," with red areas provided at the ends marked "dry" and "wet" on the left and right respectively. Below the meter 35 is a "system adjust" 56 which is a vernier that permits a limited amount of adjustment after the set point is put under lock and key. Below this is a graph recorder 57 for recording outlet temperature. At the right middle is a "system selector" switch 58 which enables the operator to choose whether he wants to operate the system in automatic mode, or his already existing system, or manual mode. Below this is a meter 59 labeled "gas valve indicator percent open" which continuously indicates the condition of the modulating valve 22 or 38 of the associated dryer. A "gas valve manual set" dial 60 is positioned below the meter 59.

A specific example of electronic circuitry which may be employed for one of the control systems 45, 46 which are identical in their construction is illustrated in FIGURES 3a and 3b. Referring to FIGURES 3a and 3b, the control system, taking the control system 45 controlling the first stage dryer 14 for convenience, essentially comprises three subsystems; the inlet temperature monitor indicated generally at 61, the moist air temperature controller 62, and the valve position indicator 63.

To describe the functions of these subsystems in a general way, the purpose of the inlet temperature monitor subsystem 61 is to continuously monitor the temperature of the dryer air which is to be mixed with the seed cotton prior to entering the dryer 14. An overtemp monitor and control circuit automatically causes a visual indication of an overtemp condition on the meter 49 as well as throttling the gas supply to the burner 18. Thus, when the inlet temperature exceeds a preset maximum value, the circuit causes both a visual indication of the condition and acts to rectify the condition by reducing the temperature of the inlet air. The value of this setting is subject to local conditions.

The moist air temperature controller subsystem 62 is essentially an analog computer. The sensors continuously monitor the variables of a predetermined thermodynamic equation and cause the system to react in such a manner as to maintain equilibrium. The perturbations created by the computer as it maintains equilibrium are the control signals used to physically adjust the heat input to the system. By compensating for the system heat loss, the balance of the heat loss in the system is proportional to the decrease in cotton moisture content.

The valve position indicator subsystem 63 provides the gin operator with a continuous, visual reading, on the meter 59 of the relative position of the gas valve 22 which controls the hot air input to the dryer 14. This indication is provided in all dryer operating modes. Together with inlet temperature monitor reading, it provides the operator with an overall picture of the dryer operation.

Referring now to the details of the circuitry illustrated in FIGURES 3a and 3b, the inlet temperature monitor circuitry 61 includes a transformer T3, whose primary winding is connected to a source of 110 volt, 60 c.p.s. voltage inducing into the secondary winding an alternating voltage which is halfwave rectified by diode CR8 and filtered by capacitor C5. Resistors R16 and R17 comprise a voltage divider and constant load on this rectified and filtered voltage. The elements above mentioned are selected and arranged in such a manner as to produce a positive voltage at the junction of capacitor C5 and resistor R16 with respect to the potential at the junction of capacitor C5 and resistor R17. The magnitude of this voltage is typically 105 volts. Further, resistors R16 and R17 are selected such that the positive potential developed across resistor R17 is equal to the voltage necessary to cause a full scale deflection of the pointer of the inlet temperature meter 49. This voltage is on the order of 10 millivolts. Switch 51 is connected in such a manner that by closing its contacts a full scale deflection of the pointer in inlet temperature meter 49 is effected. This comprises the "self-check" feature of the circuit. The pointer can also be deflected by a voltage generated by the inlet temperature thermocouple probe 41, the amount of deflection being proportional to the temperature of the thermocouple elements. Means for calibrating the meter 49 in terms of the temperature of the thermocouple is provided by resistor R18.

The inlet temperature meter 49 is a meter relay constructed with two windings such that a D.C. voltage of proper polarity impressed across either of them will cause an up-scale deflection. Meter relay 49 is further constructed such that one of these windings cannot be excited until the movable meter pointer has moved over a pre-set and adjustable span of its range. When this occurs by virtue of either the self-check voltage being applied, or the voltage generated by the thermocouple probe 41 of sufficient value to deflect the movable pointer over the pre-set span, the movable pointer, indicated at 49a in FIG. 3b, contacts a portion of the pre-set needle, indicated at 49b which completes the circuit comprising the coil of relay K2, capacitor C4, and resistor R15 which are connected to the previously described source of 105 volts, D.C. A direct current then begins flowing through the second coil of the meter relay 49, increasing the upward deflection of pointer 49a against a mechanical stop, and through the coil of K2 and resistor R15. At the instant that this circuit is completed by the meter pointer, capacitor C4 is in a discharge condition and begins to charge, demanding current in an exponentially decreasing manner causing the voltage across the coil of relay K2 to increase at a rate determined by the values of resistor R15 and capacitor C4. This voltage will reach a value such that relay K2 will "pull in" its contacts and disconnect capacitor C4 from its source of charging current. When this occurs, relay K2 is held in this position by the charge stored in capacitor C4 until the charge decreases by discharge through the coil of relay K2, to a point where the relay K2 "drops out." The process then repeats itself as long as the voltage impressed on the first coil of meter relay 49 remains of sufficient magnitude to hold the pointer against the pre-set contact during the time the second coil is deenergized.

A second set of contacts on relay K2 controls both the pair of indicating lights 50a, 50b and a second relay K1. Light 50a is connected into the circuit in such a manner that if relay K2 is in its normal position, i.e., pointer 49a on meter relay 49 is below the preset contact 49b, light 50a is illuminated, indicating the normal condition that the temperature of the inlet temperature thermocouple probe 41 is below a certain predetermined level. If the temperature of probe 41 exceeds this predetermined level, light 50b is alternately illuminated with light 50a at a rate determined by capacitor C4 and resistor R15 as previously described. This alternate flashing of light 50a and 50b indicates a high temperature condition of the thermocouple probe 41.

Relay K1 is connected in parallel with light 50a and thus is in its activated state whenever light 50a is illuminated. Relay K1 is connected to the Deviation Control Unit D1 and the System Selector switch 58 (both to be described hereinafter) in such a manner that it does not interfere with their function when in the activated position. However, when a high temperature condition exists as visually indicated by the alternate flashing of lights 50a and 50b as described above, relay K1 begins dropping out and pulling in at the rate determined by capacitor C4 and resistor R15. The ratio of $$\frac{\text{Period of time dropped out}}{\text{Period of time pulled in}}$$

of relay K1, is determined also by capacitor C4 and resistor R15 and under these conditions is always greater than unity. During that period of time when relay K1 is dropped out, a drive closed signal is applied to the modulating valve motor 22a regardless of the signal coming from the moist air temperature monitor 62 which might be drive closed, drive open or remain in position. Since the valve motor 22a always moves the valve 22 at the same rate of speed regardless of direction and since the ratio, $$\frac{\text{Period of time dropped out}}{\text{Period of time pulled in}}$$

of relay K1 is greater than unity, even though the moist temperature monitor 62 has control of the valve 22 during that period of time when relay K1 is pulled in, the valve 22 moves always in an averaged direction toward the closed position thus alleviating the overtemp condition at the thermocouple probe 41. In the event of a system power failure relay K1 drops out regardless of other conditions and drives the valve 22 to its closed position.

The just described circuitry of the inlet temperature monitor subsystem is provided to afford the important regulation of the temperature of the heated air as it hits the cotton. If the temperature of the inlet heated air is too high, a fire may result or the lines may burn out. Thus, depending on the conditions of the particular gin, this subsystem is set to turn the fuel supply off regardless of the requirements for drying.

The moist air temperature controller 62 includes a transformer T1 which converts 110 volt, 60 c.p.s. to approximately 15 volts. The 15 volt, 60 c.p.s. potential developed across the secondary winding is full wave rectified by the diodes CR1 and CR2 developing a D.C. potential of positive polarity at the junction of diodes CR1 and CR2 with respect to the potential at the center tap of the secondary of transformer T1. This potential is then filtered by the double pi-section filter comprised of resistors R1, R2, R3, and capacitors C1 and C2. The filtered potential is then regulated by the Zener diode, CR3, at the Zener voltage of this diode (typically 10 volts). This regulated voltage is impressed across a bridge network of resistors including R4, R5, R6, R7, R8, R9, R10, R11, R12. Also incorporated into the bridge network are the outlet temperature thermistor probe 42 and the ambient temperature thermistor probe 40, located at remote locations and giving the bridge a temperature sensing capability. A visual indication of bridge balance condition is provided by moist air temperature meter 55 and is graphically recorded and plotted against time by the recorder 57. Overload protection for both meter 55 and recorder 57 is provided in the form of two stabistors (diodes) CR9 and 10 and CR11 and 12 connected in parallel and "back to back" and then parallel with the signal input of each of these instruments.

The moist air temperature meter 55 is an optical type meter relay, having a pair of photoelectric cells exposed to a light source in a manner such that the intensity or quality of light falling on the photosensitive cathodes of the photocells varies in a selected relation to meter pointer position. That is to say, as the meter pointer is deflected to the right or left of its normal approximately center position, the relative light intensities sensed by the two photocells varies providing different proportional currents at two output terminals. These are connected to the deviation control circuit D–1, which may be a conventional modulating motor control of the type including a pair of relay windings controlling a movable contact which is drawn to either of two stationary contacts responsive to imbalance in the currents supplied to the two relay windings to energize the forward or reverse windings of the modulating motor. An example of a modulating motor control of this general type is disclosed in U.S. Patent No. 2,995,904 granted August 15, 1961 to Frank R. Marshall, the transmitter potentiometer of which is displaced by the photocells of the meter 55 and the followup potentiometer driven by the motor being displaced by the feedback potentiometer in the present embodiment.

The moist air temperature meter 55, in addition to giving a visual indication of bridge balance condition, in this manner also controls the valve 22 so that when a temperature other than a predetermined temperature is sensed by the bridge, meter 55 initiates corrective valve action after this bridge unbalance reaches a predetermined magnitude. The resistor R9 is the operative element of the outlet temperature control set 54, and resistor R8 and R9 are selected and interconnected into the bridge circuit in such a manner that after the bridge has been calibrated by adjustment of resistor R11, the dial of the outlet temperature control set 54 connected to the sliding contact of resistor R9 reads out the temperature of the outlet temperature thermistor probe 42 at which the bridge will balance. Resistor R7 is selected and connected into the bridge circuit in such a manner that it determines the span of unbalance as registered by meter 55 and recorder 57. Resistor R6, which is the operative element of the fine temperature system adjust control 56, is selected and connected into the bridge circuit in such a manner that it allows minor adjustment of bridge balance temperature. Resistor R12 is selected and connected into the bridge circuit in such a manner that it controls the amount of feedback applied to the bridge circuit by the feedback potentiometer, here indicated by 22a', which monitors the position of valve 22.

Resistor R4 controls the amount of influence that the change of resistance of the secondary thermistor has on bridge balance when sensing ambient temperature and switch S5 is in closed position, and the network formed by R4, R5 and R10a, R10b controls the amount of influence that the change of resistance of the secondary thermistor has on bridge balance when sensing outlet air temperature of the first dryer and switch S5 is in open position. If the secondary thermistor is used to measure ambient temperature, as with probe 40, this amount of influence (or preemphasis) is determined in such a manner that a change in temperature ($\Delta T$) of the ambient thermistor probe 40 will result in a bridge unbalance that is equal in magnitude and direction to a bridge unbalance caused by a change of temperature on the outlet thermistor equal to $\Delta T/C$, where C is a predetermined and fixed parameter, (typically 10), and $\Delta T$ is the change in thermistor temperature. When used under these conditions switch S5 is in the closed position.

The control system circuit is a standardized design so that it can be readily used to control the first dryer 14 or the second dryer 28. In the latter case, the secondary thermistor senses outlet air temperature of the first dryer instead of ambient temperature. If the secondary thermistor is used to sense the outlet temperature of the previous dryer, then C in the $\Delta T/C$ is constantly variable over a range of values (typically 2–20) by adjusting the dual potentiometer R10. Switch S5 is in the open position under these conditions. Switch 58 is a 3 pole, 3 position switch which selects the method of control desired. These being, Auto: control by the system previously described; Local: control by any other control system, as the previously existing control system of the gin owner; and Manual: valve is positioned by means of switch 60 to any desired position. Lamps 58a, 58b and 58c give rapid visual indication of which method of control is in use. The primary power input to the system is fused for overload protection by the fuse 52 and visual indication of fuse failure is provided by the indicating fuse holder. Means of ON-OFF control of primary power is provided by switch 53, a rotary single pole, double throw switch.

The valve position indicator subsystem 63 includes a 110 volt to 6.3 volt transformer T2 with primary connected to a source of 110 volt, 60 c.p.s. power. Induced in the secondary winding is a voltage of 6.3 volts used to power relay K1 and the various pilot lights 50a, 50b, 58a, 58b and 58c and also to power the full wave bridge rectifier circuit comprised of diodes CR4, CR5, CR6 and CR7. The resulting D.C. voltage appearing between the junction of diodes CR4 and CR5 (negative) and the junction of diodes CR6 and CR7 (positive) is filtered by the pi-section filter resistor R13, capacitor C3 and resistor R13A. This voltage is impressed across the valve position indicating potentiometer, here designated as 22a" mounted on the valve motor 22a. The arm of this potentiometer 22a" moves in a motion proportional to valve rotation so that the voltage appearing between the arm of this potentiometer and the negative side of the potentiometer is directly proportional to the valve positioned at any time. This voltage then is impressed across resistors R13B and R14, and meter 59, which is calibrated as valve percentage open. Resistors R13B and R14 are selected and adjusted in such a manner that meter 59 reads 100% when the valve 22 is in the full open position.

The action of the two dryer systems is correlated in a preselected balance relation, as has been previously referred to in general terms by a preempt unit 47. The effect of this is to so interrelate the action of the two stages or dryer systems that, while they are in a sense independent, the second system is affected by changes which occur in the first system. The arrangement is such that, when the first dryer is affected by a moisture change, a second balance system, that of the second dryer, requires that if the first one changes the second one must compensate within the limits of its own balance system. That is to say, when the moisture content increases, the heat to the first dryer is increased. This out-of-balance condition feeds a signal to the bridge of the control system for the second dryer in the same fashion that a change in ambient affects the first dryer. Once the first dryer has called for extra drying and cannot fill the bill, the second dryer is immediately ready to take over.

This preempt correlation of the two control systems can be accomplished by two different, but related circuit arrangements, illustrated in FIGURES 4 and 5. FIGURE 4 illustrates the use of a dual-bead probe as the output temperature probe 42 of the first stage dryer 14, which electrically isolates, yet thermally connects, the first and second dryer bridge control circuits. FIGURE 5 illustrates a three-legged bridge unit for electrically interconnecting the bridge control circuits of the two dryers.

In the preempt circuit illustrated in FIGURE 4, the bridge circuits of control systems 45 and 46 share a common temperature sensing probe, the effective resistances 42A and 42B of outlet temperature probe 42.

The net effect of the bridge network of FIGURE 4 on system performance is such that the bridge balance point of meter 55 of control system 45 is largely dependent on probe portion 42A, and dependent to a smaller degree on probe 40. The bridge balance point of moist air temperature meter 55' of the second control system 46 is dependent largely on outlet probe 44 of the second system and to any degree desired on probe portion 42B. (This being made possible by padding and trimming probe portion 42B with different values of resistances. In actual application, this degree of interaction is continuously variable by means of a back panel control which is omitted from FIGURE 4 for reasons of clarity.)

Therefore, if control system 45 is balanced for operation at some predetermined outlet temperature by adjustment of outlet temperature set dial 54 (whose dial can be calibrated in temperature by means of R11) and that temperature is being maintained by dryer 14, control system 46 controls its dryer 28 at a bridge balance point determined by the adjustment of its outlet temperature set dial 54' (whose dial is calibrated in temperature by R11') and probe 44. However, if control system 45 fails to maintain its preset outlet temperature, an error signal is sensed by control system 46 from probe portion 42B causing it to call for more or less heat dependent on the polarity of the error signal. Control system 46 then controls its outlet temperature as determined by probe 44 and by probe portion 42B. The influence of probe portion 42B is adjustable as detailed above.

As another alternate, the electrical interconnection of the two dryer bridge-control systems may be accomplished by what has been termed a "three-legged-bridge" as depicted in FIGURE 5. In this configuration the active elements of the bridge controlling the null of outlet temperature meter 55 and hence the valve position of dryer 14 are the ambient probe 40 and dryer 14 outlet probe 42. Similarly, the active elements of the bridge controlling the null of outlet temperature meter 55' of dryer 28 and hence the valve position of dryer 28 are the outlet probe 42 of the first system and the outlet probe 44 of the second system. The net effect on system performance by this interconnection of bridge elements is such that the control point (or bridge balance point) of meter 55 is largely dependent on probe 42 and dependent to a smaller degree on probe 40. The bridge balance point of meter 55' is dependent equally on probes 42 and 44.

Thus, if the first system is balanced for operation at some predetermined outlet temperature by adjustment of its outlet temperature set dial 54, and that temperature is being maintained constant by dryer 14, the second system controls its dryer 28 at a bridge balance point determined by the adjustment of its outlet temperature set dial 54' and its outlet temperature probe 44. However, if the first system fails to maintain its preset outlet temperature, an error signal, or bias, is sensed by the second system by virtue of the common probe 42, causing it to call for more or less heat depending upon the polarity of the error signal. Under these conditions, dryer 28 derives its bridge balance point from both probes 42 and 44 equally. It will be apparent that in the case of this FIGURE 5 form of preempt arrangement, the three-legged bridge is substituted for the bridge circuit of each of the two control systems 45, 46.

It has been found that with the above-described automatic moisture control system, drying per pass of cotton through a single dryer of as much as 6% are obtainable with feed rates of about 200 pounds per minute of trailer cotton and trailer moisture content of from 7% to 15%, in an environment having atmospheric humidity of from 40–60% and a dry bulb temperature of 85° F. to 105° F. In such a case, the inlet air temperatures varied from 350° F. to 420° F. and the exhaust temperatures ranged from 140° F. to 200° F. In practice, however, it is rarely necessary to exceed outlet temperatures of 170° F.

In initially adjusting such an automatic moisture control drying system installation, which is performed by an installation engineer, the outlet temperature thermistor probes 42, 44 are first calibrated by means of a thermometer, and, assuming preempt arrangement of FIGURE 4 employing the double bead type of probe 42 is used to correlate action of the two dryers, the bridges of the two control systems are adjusted to increase or decrease the effect of the double bead probe 42 in the first dryer control system 45 so that the first dryer dominates. Finally, a portable moisture meter is inserted in the cotton discharged from each of the dryers 14 and 28 and the calibrating resistors R11, R12 and R11', R12' of the bridge networks of the two control systems are adjusted so that the outlet temperature set dials 54, 54' read correctly and the dials 54, 54' are set to establish correct set points for reducing moisture content of the cotton being processed to the desired level, as measured by the portable moisture meter, for the set of conditions then present. The system will thereafter automatically compensate for variations in input and ambient conditions to cause the cotton discharged into the conveyor distributor to maintain the desired moisture content.

The above-described automatic moisture control system can also be adapted with minimum modification to control of a pair of separate cotton cleaning and drying lines to supply greater quantities of cleaned and appropriately dried cotton to a set of gin stands. Obviously, one cannot gin any faster than one can get the cotton into the gin. By providing a pair of suction collection lines 70, 71 in each trailer or other cotton hauling vehicle and two complete drying and cleaning systems 72, 73 supplied by the respective suction collection lines and feeding the cotton to the single conveyor distributor, as illustrated diagrammatically in FIGURE 6, thus providing a "split stream" cotton feed system, cotton can be delivered to the gin at a greater rate. Such a split stream drying system can be operated from the same two control systems 45, 46 previously described, in connection with two dryers arranged in series, by slaving one of the drying and cleaning lines to the other. Preferably, the pair of dryers in the line connected to the suction collection line at the "wet" end of the trailer, usually the lead end, serves as the master line and has the inlet and outlet probes 41, 42, 43 and 44 inserted therein as described previously. The modulating motors 22a and 38a in this master line are each provided with an additional potentiometer whose wiper arm is connected to the modulating motor shaft. These potentiometers are connected to balancing relay units similar to the deviation control circuit D-1 previously described, to provide power to the forward and reverse motor windings of modulating motors connected to fuel supply regulating valves for the burners of the second or slave line of dryers. The added potentiometer on the modulating motor 22a is connected to the balancing relay unit which controls the modulating motor and valve regulating the heated air supply to the first dryer of the slave line and the added potentiometer on the modulating motor 38a similarly controls the heated air supply to the second dryer of the slave line. Thus, as the modulating motors 22a and 38a of the master line move responsive to thermal conditions sensed in the master line, the corresponding modulating motors in the slave line are driven to positions matching the positions of the motors 22a, 38a to control the slave line. In this way, duplication of the control systems 45, 46 is not required when additional drying and cleaning lines are added for split stream feed systems.

It will be apparent that the above-described system of dryers and control systems may also be readily modified to increase the moisture content of cotton where cotton supplied to the system or a selected portion thereof has a moisture content lower than the desired optimum value. For example, the second stage of the drying system involving the second dryer 28 may be employed as a humidifier by injecting moist heated air rather than dry heated air into the second dryer, the humidity of the moist heated air supplied to the second dryer 28 being regulated by one or more modulating motors like the motor 38a. For example, one such modulating motor may be employed to regulate burner, and therefore air, temperature and another modulating motor may be employed to regulate water pressure in a sprinkler supply line introducing moisture into the heated air. In such a case, if the moisture content of cotton discharged from the first dryer 14 has a lower value than the selected optimum value, due for example to very dry cotton being fed to the system, the sensors in the two systems will provide monitor signals indicative of this condition and the control system 46 can be adjusted to provide such controlled moist air injection into the second dryer as to elevate the cotton moisture content to the desired value.

While but one preferred embodiment of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. The method of regulating the moisture conditions of material being fed along a flow path through an enclosure system including a conditioning chamber having an inlet end and an outlet end spaced along the flow path to cause the material at said outlet end to have a selected uniform moisture content, comprising continuously monitoring conditions indicative of system air temperatures at points spaced from the material flow path adjacent said inlet and outlet ends and bearing a determinable relation to material moisture content differential between said points, monitoring further conditions indicative of the temperature of the material being fed to the sytem and of the heat less properties of the system, supplying conditioning air to the conditioning chamber in moisture exchange relation to the material therein, and varying as a selected function of changes in differential air temperatures at said spaced points and as a function of variation in said further conditions a property of the conditioning air supplied to said chamber which produces change in the moisture content of the material to continuously adjust said property of the conditioning air to values to maintain the selected uniform moisture content of the material at said outlet end.

2. The method of regulating the moisture conditions of material being fed along a flow path through an enclosure system including a conditioning chamber having an inlet end and an outlet end spaced along the flow path to cause the material at said outlet end to have a selected uniform moisture content, comprising supplying conditioning air to the conditioning chamber in exchange relation to the material therein, continuously monitoring a condition indicative of air temperature of the conditioning air supplied to the inlet end of said conditioning chamber, monitoring the system air temperature at the outlet end of the conditioning chamber at a point spaced from the material in said flow path, monitoring further conditions indicative of the temperature of the material being fed to the system and of the heat loss properties of the system, and varying the supply of conditioning air to said chamber in preselected function relationship in response to variation in said further conditions and to variations in the difference between the condition and temperature monitored to cause the material through exchange with the conditioning air to have a selected moisture content upon discharge from the chamber, and to maintain a substantially constant system air temperature at said outlet end so long as inlet moisture content departure from said selected content does not exceed the moisture extracting capacity of the chamber.

3. The method of regulating the moisture conditions of material being fed along a flow path through an enclosure system including a conditioning chamber having an inlet end and an outlet end spaced along the flow path to cause the material at said outlet end to have a selected uniform moisture content, comprising continuously monitoring conditions indicative of system air temperatures at points spaced from the material flow path adjacent said inlet and outlet ends and bearing a determinable relation to material moisture content differential between said points, continuously monitoring ambient air temperature, supplying conditioning air to the conditioning chamber in moisture exchange relation to the material therein, and varying as a selected function of changes in differential air temperatures at said spaced points a property of the conditioning air supplied to said chamber which produces change in the moisture content of the material and changes in ambient air temperature to continuously adjust said property of the conditioning air to values to maintain the selected uniform moisture content of the material at said outlet end.

4. The method of regulating the moisture conditions of material being fed along a flow path through an enclosure system including a conditioning chamber having an inlet end and an outlet end spaced along the flow path to cause the material at said outlet end to have a selected uniform moisture content, comprising continuously monitoring conditions bearing a preselected relation to the temperature differential between system air temperatures at said inlet and outlet ends at points spaced out of the material flow path indicative of moisture content differential of the material at said inlet and outlet ends, generating electrical control signals indicative of variations in said temperature differential from a selected condition, continuously sensing ambient air temperature and generating electrical control signals indicative of variations therein, generating distinctive electrical conditions responsive to relative variations in said control signals, and varying the supply of conditioning air to said conditioning chamber responsive to said distinctive electrical conditions to maintain the moisture content of the material at said outlet end at a selected uniform value.

5. The method of drying seed cotton being fed along a flow path through an enclosure system including a cotton dryer and a conditioning chamber arranged in series relation along the flow path each having an inlet end and an outlet end to cause the cotton at a discharge point in the flow path to have a selected uniform moisture content, comprising continuously monitoring conditions indicative of system air temperatures at points spaced from the cotton flow path adjacent said inlet and outlet ends of said dryer and bearing a determinable relation to cotton moisture content differential between said points, continuously monitoring ambient air temperature, supplying heated air to the dryer in heat exchange relation to the cotton therein and varying the temperature of the heated air supplied to said dryer in selected relation to changes in differential air temperatures at said spaced points and changes in ambient air temperature, means continuously monitoring conditions indicative of system air temperatures at monitoring points spaced from the cotton flow path adjacent said inlet and outlet ends of said conditioning chamber related to cotton moisture content differential between said monitoring points, supplying conditioning air to said conditioning chamber in moisture exchange relation to the cotton therein, and varying in a selected relation to changes in the air temperature monitored at the outlet end of said dryer and to changes in differential air temperatures between said monitoring points a property of the conditioning air supplied to said chamber which produces change in moisture content of the cotton to continuously adjust said property of the conditioning air to values so that the combined effect of heat exchange in said dryer and moisture exchange in said chamber causes the cotton at the outlet end of said chamber to have a selected uniform moisture content.

6. In apparatus for changing the moisture conditions of a material flowing through an enclosure system which comprises a conditioning chamber having a feed end and a discharge end, means for supplying the material to said feed end, means for supplying conditioned air to the feed end of said conditioning chamber to travel through said chamber in moisture exchange relation to the material therein, means for varying a property of said conditioning air which changes the moisture content of the material when in moisture exchange relation therewith before the conditioning air is supplied to said chamber, and outlet means for receiving the material and system air from the discharge end of said conditioning chamber and removing system air from the material, the improvement comprising automatic control apparatus for continuously causing the material discharged into said outlet means to have a selected uniform moisture content including temperature sensing means for monitoring air temperature at a location spaced from said conditioning chamber bearing a selected relation to the temperature of the material being supplied to the feed end of said chamber and producing signals proportional to the temperature sensed, signal means responsive to conditions bearing a selected relation to the system air temperatures of conditioned air at said feed end and at said outlet means at points spaced out of contact with the material to produce signals indicative of differential temperatures between the locations of said signal means representing a selected function of the moisture content differential between the material fed to said feed end and the material at said outlet means, and means responsive to variations in said signals generated by said signal means and said sensing means for continuously regulating said means for varying the conditioning air to provide moisture exchange conditions in said chamber which will maintain the moisture content of material discharged into said outlet means at the selected uniform values.

7. In apparatus for changing the moisture conditions of seed cotton and the like in an enclosure system which comprises a cotton conditioning chamber having a feed end and a discharge end, an inlet duct means communicating with the feed end of said conditioning chamber, cotton feed means communicating at a feed point with said inlet duct means to supply cotton thereto, means for supplying conditioned air to said inlet duct means upstream of said feed point, means for varying a property of said conditioning air which changes the moisture content of cotton when in moisture exchange relation therewith before the conditioning air is supplied to said inlet duct means, and outlet means for receiving cotton from the discharge end of said conditioning chamber and removing system air from the cotton, the improvement comprising automatic control apparatus for continuously causing the cotton discharged into said outlet means to have a selected uniform moisture content including temperature sensing means for monitoring ambient air at a location spaced from said conditioning chamber for producing therefrom signals indicative of the temperature of the seed cotton being fed to the feed end of said chamber and of the heat loss properties of the system, signal means responsive to conditions bearing a selected relation to the system air temperatures of conditioned air at said inlet duct and at said outlet means at points spaced out of contact with the cotton to produce signals indicative of differential temperatures between locations of said signal means representing a selected function of the moisture content differential between cotton fed to said feed point and cotton at said outlet means, and means responsive to variations in said signals generated by said signal means and said sensing means for continuously regulating said means for varying the conditioning air to provide moisture exchange conditions in said chamber which will maintain the moisture content of cotton discharged into said outlet means at the selected uniform values.

8. In apparatus for drying seed cotton which comprises a seed cotton dryer, an inlet duct communicating with said dryer, cotton feed means communicating at a feed point with said inlet duct to supply cotton thereto, means for supplying heated air to said inlet duct upstream of said feed point, means for heating said air before the air is supplied to said inlet duct, and outlet means for removing air and cotton from said dryer; the improvement comprising automatic control apparatus for maintaining the moisture content of cotton delivered to said outlet means at a selected moisture content value including means for producing first monitor signals continuously indicative of the temperature of heated air supplied by said air heating means to said inlet duct, an air temperature responsive sensor located in said outlet means spaced from the cotton flow path for sensing the temperature of air delivered from said dryer to said outlet means indicative of moisture extracted from the cotton upon passage through the dryer and producing second monitor signals proportional thereto, regulating means for said air heating means responsive to control signals for varying said air heating means to increase and decrease the temperature of the heated air supplied to said inlet duct, and control means responsive to said monitor signals bearing preselected relation to the temperatures of the heated air supplied to said inlet duct and of the air delivered from said dryer to said outlet means for applying control signals to said regulating means which vary as a function of variations in temperature differential signified by said monitor signals for continuously adjusting the air heating means to supply air to said inlet duct to proper temperature to maintain a selected uniform moisture content of the cotton delivered from said dryer to said outlet means.

9. In apparatus for drying seed cotton which comprises a seed cotton dryer, an inlet duct communicating with said dryer, cotton feed means communicating at a feed point with said inlet duct to supply cotton thereto, means for supplying heated air to said inlet duct upstream of said feed point, means for heating said air before the air is supplied to said inlet duct, and outlet means for removing air and cotton from said dryer; the improvement comprising automatic control apparatus for maintaining the moisture content of cotton delivered to said outlet means at a selected moisture content value including means having sensible conditions which vary in a selected functional relation to temperature of the heated air supplied to said inlet duct for producing first monitor signals continuously indicative of the temperature of said heated air, an air temperature responsive sensor located in said outlet means spaced from the cotton flow path for sensing the temperature of air delivered from said dryer to said outlet means indicative of moisture extracted from the cotton upon passage through the dryer and producing second monitor signals proportional thereto, an ambient air temperature sensor located externally of said dryer and duct to produce third monitor signals indicative of ambient air temperatures, regulating means for said air heating means responsive to control signals for varying said air heating means to increase and decrease the temperature of the heated air supplied to said inlet duct, and control means responsive to said third monitor signals and to said first and second monitor signals bearing preselected relation to the temperatures of the heated air supplied to said inlet duct and of the air delivered from said dryer to said outlet means for applying control signals to said regulating means which vary as a function of variations in temperature differential signified by said monitor signals for continuously adjusting the air heating means to supply air to said inlet duct to proper temperature to maintain a selected uniform moisture content of the cotton delivered from said dryer to said outlet means.

10. In apparatus for drying seed cotton which comprises a seed cotton dryer having a feed end and a discharge end, cotton feed means communicating with said feed end to supply cotton to said dryer for passage therethrough, means for supplying heated air to said feed end of said dryer, heater means for heating said air before the air is supplied to said feed end, and outlet enclosure means for removing air and cotton from said dryer; the improvement comprising automatic control apparatus for maintaining the moisture content of cotton delivered to said outlet enclosure means at a selected moisture content value including a movable regulator for said heater means for varying the temperature of the heated air supplied to said dryer as a selected function of regulator position, signal means responsive to regulator positions to produce monitor signals continuously signifying regulator position, an air temperature responsive sensor located in said outlet enclosure means spaced out of contact with the cotton therein for sensing the temperature of air delivered from said dryer to said outlet enclosure means and producing sensor signals proportional thereto, and control means including an electrical bridge circuit including portions responsive to said monitor signals and said sensor signals for unbalancing the bridge circuit from a selected balanced condition responsive to relative variations in said signals as a function of variations in temperature differential between the heated air supplied by said heater means and the air in said outlet enclosure means, and means responsive to unbalancing of said bridge circuit for adjusting said regulator to supply air to said dryer at proper temperature to maintain a selected uniform moisture content of the cotton delivered from said dryer to said outlet enclosure means.

11. In apparatus for drying seed cotton, the combination defined in claim 10, including sensor means for sensing ambient air temperatures at a location spaced externally of the dryer and producing ambient sensor signals proportional thereto, and said bridge circuit including portions responsive to said ambient sensor signals for modifying the control action of said bridge circuit on said regulator to modify adjustment of the regulator as a function of variations in ambient air temperature.

12. In apparatus for drying seed cotton, the combination defined in claim 8 including an air temperature sensor in said inlet duct upstream of said feed point for producing signals proportional to the temperature of the heated air supplied by said air heating means, and means settable to respond to signals produced by said last-mentioned sensor representing air temperatures in said inlet duct exceeding a selected maximum value for modifying operation of said control means to produce a temperature reducing adjustment of the air heating means in an amount to reduce the air temperature in said inlet duct below said maximum value.

13. In apparatus for drying seed cotton, the combination defined in claim 10 including an air temperature sensor located in the path of the heated air being supplied by said heater means to the feed end of said drying tower to produce signals continuously denoting the air temperature monitored thereby, and relay means responsive to signals produced by said last-mentioned sensor representing temperatures exceeding a selected value for cyclicly modifying response of said means responsive to bridge unbalance to effect adjustment of said regulator in a temperature reducing direction to a sufficient extent to reduce the air temperature at said last-mentioned sensor below said selected value.

14. In apparatus for drying seed cotton and the like, an enclosure system including first and second cotton drying sections arranged in series along a cotton flow path through the system, each said section comprising a cotton dryer having inlet and outlet ends and heater means for supplying heated air to the inlet end of said dryer and outlet means for receiving air and cotton from said outlet end and separating the air from the cotton, regulator means for each of said heater means for controlling the temperature of the heated air supplied thereby, means for supplying cotton to the feed end of the dryer of said first section, duct means for transferring cotton from the first section outlet means to the inlet end of the second section dryer, first and second control units for said first and second sections respectively for supplying control signals to said regulator means of the associated section to adjust the regulator means and the air temperature controlled thereby, an ambient air temperature sensor located externally of the enclosure system to produce signals signifying ambient air temperature, each of said sections including signalling means for producing signals which vary in a known functional relation to variations in the temperature of air supplied to the dryer inlet end of the associated section and air temperature sensor means in the outlet means of the associated section in the path of air discharged from the dryer outlet end and separated from cotton to produce signals signifying the air temperature in said outlet means, means applying said signals signifying ambient air temperature and the signals produced by said signalling means and said sensor means of said first section to said first control unit to vary the control signals produced thereby in selected relation to variations in said signals bearing a determinable correlation to variations in cotton moisture content differential between the inlet and outlet ends of the first section dryer to adjust the associated regulator means so as to provide heated air temperatures which will maintain a selected cotton moisture content differential along the first section dryer, and means applying the signals produced by said sensor means of said first section and by said signalling means and said sensor means of said second section to said second control unit to vary the control signals produced thereby in selected relation to variations in said signals to produce control signals causing the regulator means of said second section to provide heated air temperatures which will produce a selected uniform cotton moisture content at the outlet means of said second section.

15. In apparatus for drying and cleaning seed cotton and the like, a drying and cleaning enclosure system including first and second cotton drying and cleaning sections arranged in series along a cotton flow path through the system, each said section comprising a cotton dryer having inlet and outlet ends and heater means for supplying heated air to the inlet end of said dryer and outlet means including a cotton cleaner for receiving air and cotton from said outlet end and separating the air from the cotton, regulator means for each of said heater means for controlling the temperature of the heated air supplied thereby, means for supplying cotton to the feed end of the dryer of said first section, duct means for transferring cotton from the first section outlet means to the inlet end of the second section dryer, first and second control units for said first and second sections respectively for supplying control signals to said regulator means of the associated section to adjust the regulator means and the air temperature controlled thereby, an ambient air temperature sensor located externally of the enclosure system to produce signals signifying ambient air temperature, each of said sections including signalling means for producing signals which vary in a known functional relation to variations in the temperature of air supplied to the dryer inlet end of the associated section and air temperature sensor means in the cotton cleaner of the associated section in the path of air discharged from the dryer outlet end and separated from cotton to produce signals signifying the air temperature in said cotton cleaner, means applying said signals signifying ambient air temperature and the signals produced by said signalling means and said sensor means of said first section to said first control unit to vary the control signals produced thereby in selected relation to variations in said signals bearing a determinable correlation to variations in cotton moisture content differential between the inlet and outlet ends of the first section dryer to adjust the associated regulator means so as to provide heated air temperatures which will maintain a selected cotton moisture content differential along the first section dryer, and means applying the signals produced by said senesor means of said first section and by said signalling means and said sensor means of said second section to said second control unit to vary the control signals produced thereby in selected relation to variations in said signals to produce control signals causing the regulator means of said second section to provide heated air temperatures which will produce a selected uniform cotton moisture content at the outlet means of said second section.

16. In apparatus for drying seed cotton, the combination defined in claim 14 including means for adjustably correlating control action of said first and second control units responsive to the signals applied thereto to provide selected coordination of the supply of heated air to dryers of said first and second sections.

17. In apparatus for drying seed cotton the combination defined in claim 11 including a second seed cotton dryer having feed and discharge ends and second outlet enclosure means for removing air and cotton from the discharge end of said second dryer defining a second cotton processing system associated with said first-mentioned dryer and outlet enclosure means, means connected to said first-mentioned and second outlet enclosure means to receive cotton from both said outlet enclosure means, second heating means for heating air and supplying the same to the feed end of said second dryer, second regulator means for varying the temperature of the heated air supplied to said second dryer, second cotton feed means communicating with the feed end of said second dryer to supply cotton thereto, a plurality of cotton collecting means for transferring cotton from separate portions of a cotton supply container to said first-mentioned cotton feed means and said second cotton feed means respectively, and position repeater means connected between said first-mentioned regulator means and said second regulator means for continuously positioning said second regulator means in selectively coordinated relation to the positions of said first-mentioned regulator means.

18. In apparatus for drying seed cotton, the combination defined in claim 14 including a second enclosure system including first and second cotton drying sections arranged in series relation along a second cotton flow path forming an alternate flow path relative to said first enclosure system, each of said sections of said second enclosure system including a cotton dryer, heater means, outlet means and regulator means like the dryer, heater means, outlet means and regulator means of said first-mentioned drying sections, means for supplying cotton to the first section cotton dryer of said second enclosure system from a source point spaced from the source point of cotton supplied to said first-mentioned enclosure system, first and second position repeater means connected between the first and second section regulator means respectively of both said enclosure systems for continuously positioning the associated regulator means of the second enclosure system in substantially corresponding position to the associated regulator means of the first-mentioned enclosure system.

19. Apparatus for transferring seed cotton from a supply container to a delivery zone for at least one gin stand and drying the same to a selected moisture content during transfer of the cotton to said delivery zone comprising a first cotton transfer line extending from said containers to said delivery zone including at least one cotton dryer means having a feed end and a discharge end and suction transfer conduit means adapted to be positioned at selected points in the supply container to withdraw cotton therefrom and deliver the same to said feed end of said dryer means, a second cotton transfer line extending from said container to said delivery zone including a cotton dryer means having a feed end and a discharge end for each cotton dryer means of said first line and suction transfer conduit means to be positioned in said supply container at points spaced from said selected points to withdraw cotton therefrom and deliver the same to the feed end of the associated dryer, air heater means associated respectively with each of the dryers for supplying heated air at variable temperatures to the feed end of each dryer, means associated with said dryer means of said first line for sensing conditions representing a selected function of differential air temperature between the feed and discharge ends thereof and regulating said air heater means associated with the dryer means of said first line to produce temperatures providing a selected uniform cotton moisture content for cotton discharged from said first line to said delivery zone, and coordinating means connecting the air heater means of said second line in slaved relation with the air heater means of said first line for regulating the temperatures of heated air supplied to dryer means of said second line in preselected relation to the conditions of the air heater means for corresponding dryer means of said first line.

References Cited by the Examiner
UNITED STATES PATENTS

| | | | |
|---|---|---|---|
| 2,205,814 | 6/1940 | Forster | 34—54 |
| 2,968,874 | 1/1961 | Fishburn | 34—48 |

FREDERICK L. MATTESON, Jr., *Primary Examiner.*

JOHN J. CAMBY, *Examiner.*